Patented Sept. 15, 1931

1,823,614

UNITED STATES PATENT OFFICE

NORMAN E. LEMMON, OF WHITING, INDIANA, ASSIGNOR TO STANDARD OIL COMPANY, OF WHITING, INDIANA, A CORPORATION OF INDIANA

TREATMENT OF NAPHTHENIC OILS

No Drawing.   Application filed May 12, 1928.   Serial No. 277,394.

This invention relates to the treatment of naphthenic oils and particularly to the treatment of naphthenic lubricating oils for the purpose of improving their color, removing unstable compounds therefrom and neutralizing them.

In the color treatment of paraffin base lubricating oil it is known that the amount of sulfuric acid necessary is greatly reduced if the sour oil is finished by contacting with fuller's earth or other suitable clay instead of neutralizing with caustic soda. It would be desirable to apply such treatment to naphthenic base lubricants which contain a relatively high cyclic content and undergo relatively high losses when treated to color with sulfuric acid alone. In practice it is found that naphthenic oils require an abnormally large proportion of clay in order to give complete neutralization of the sour oil. Accordingly naphthenic oils are not treated to color with sulfuric acid and clay.

I have discovered that the cause of the high clay requirement is apparently due to the presence of naphthenic acids which are probably sulfonated during the sulfuric treatment and are not readily adsorbed by clay.

According to the present invention I first remove naphthenic acids from the oil and then subject it to sulfuric acid treatment and treatment with clay in such quantities that the desired color and substance neutralization result.

I have also discovered that the total sulfuric acid requirement may be reduced by treating the oil lightly with sulfuric acid before removal of the naphthenic acids.

The naphthenic acids may be removed in any suitable way. They may, for example, be extracted with alcohol, or with alkali sulfonates in the manner described in the copending application Serial No. 176,828, filed March 19, 1927 by C. R. Baker.

The invention will readily be understood from the following specific example.

A naphthenic lubricating distillate having a viscosity of about 300 sec. Saybolt at 100° F., having an acidity of 0.75 mg. of KOH per gram of oil and of very dark color is treated with 0.25 lbs. of 89% sulfuric acid per gallon of oil. The oil is allowed to settle and sludge is withdrawn. The oil is neutralized with caustic soda and about 1.5 to 2% on the volume of oil, of a 20% solution of alkali metal compounds of the preferentially water soluble sulfonic acids derived from mineral oils in the manner described in U. S. Patent No. 1,474,933, granted November 20, 1923 on the application of Humphreys and others, or in other suitable manner, is added and the mixture steamed. Thereafter the mixture is allowed to settle and the aqueous layer is drawn off. The acidity is thereby reduced to zero, but the color is still dark.

The oil is then subjected to an acid treatment with 0.1 lbs. of 89% sulfuric acid per gallon of oil or such other amount of acid of this or a lesser strength as is required to give the desired color in the finished oil. After settling and withdrawing the sludge, the sour oil is agitated with 10 lbs. of finely divided fuller's earth or other suitable clay per 100 lbs. of oil at a temperature of 150 to 300° F. The clay with its adsorbed sludge and coloring matter is separated by filtration yielding a finished oil having an acidity of 0.04 mg. of KOH per gram of oil and a color of 2P.

In practice it is preferred not to employ acid of a strength above 89% in order to prevent sulfonation of valuable lubricating constituents. Weaker acid may be employed if desired, but the amounts thereof should be somewhat larger; for example, approximately double the amount of 80% acid may be used.

Although the present invention has been described in connection with the details of a specific example thereof, it must be understood that such details are not intended to be limitative upon the scope of the invention except in so far as included in the accompanying claims.

I claim:

1. The method of treating lubricating oils having a substantial degree of naphthenic acidity which consists in subjecting said oils to a light sulfuric acid treatment, extracting naphthenic acid compounds from said oils with aqueous solution of alkali salts of water soluble sulfonic acids, then treating the sour oils with sulfuric acid and thereafter treating the sour oil with clay, said acid and clay being used in amounts to give a finished oil of desired color and in substantially neutralized condition.

2. The method of treating naphthenic lubricating oils which consists in subjecting said oils to a treatment with 0.25 lbs of 89% sulfuric acid per gallon of oil, settling and removing the sludge, neutralizing the oil with sodium hydroxide, then extracting naphthenic compounds from said oils with aqueous solution of alkali compounds of preferentially water soluble sulfonic acids derived from mineral oil, then treating the oil with 0.1 lbs. of 89% sulfuric acid per gallon of oil, settling, removing the sludge, contacting the sour oil with 10 lbs. of clay per 100 lbs. of oil at about 150° F. and filtering the oil from the clay.

3. The method of treating naphthenic lubricating oils which consists in subjecting said oils to a sulfuric acid treatment equivalent in effect to treatment with 0.25 lbs. of 89% sulfuric acid per gallon of oil, settling and removing the sludge, extracting naphthenic acid compounds from said oils, then subjecting said oils to an acid treatment equivalent in effect to treatment with 0.1 lbs. of 89% sulfuric acid per gallon of oil, and treating the sour oils with clay.

4. The method of treating naphthenic lubricating oils which consists in subjecting said oils to sulfuric acid treatment equivalent in effect to treatment with 0.25 lbs. of 89% sulfuric acid per gallon of oil, settling and removing the sludge, extracting naphthenic acid compounds from said oils with aqueous solution of alkali salts of preferentially water soluble sulfonic acids, then subjecting said oils to an acid treatment equivalent in effect to treatment with 0.1 lbs. of 89% sulfuric acid per gallon of oil, and treating the sour oils with clay.

5. The method of treating lubricating oils having a substantial degree of naphthenic acidity which consists in subjecting said oils to a light sulfuric acid treatment, then neutralizing the oil with sodium hydroxide, then extracting naphthenic acid compounds from said oils with aqueous solution of alkali salts of preferentially water soluble sulfonic acids, then treating the sour oils with sulfuric acid and thereafter treating the sour oil with clay, said acid and clay being used in amounts to give a finished oil of desired color and in substantially neutralized condition.

In testimony whereof I have hereunto set my hand this 3rd day of May, 1928.

NORMAN E. LEMMON.